March 27, 1962 P. D. BARAKAUSKAS 3,026,649
PLANT SUPPORT
Filed July 20, 1959
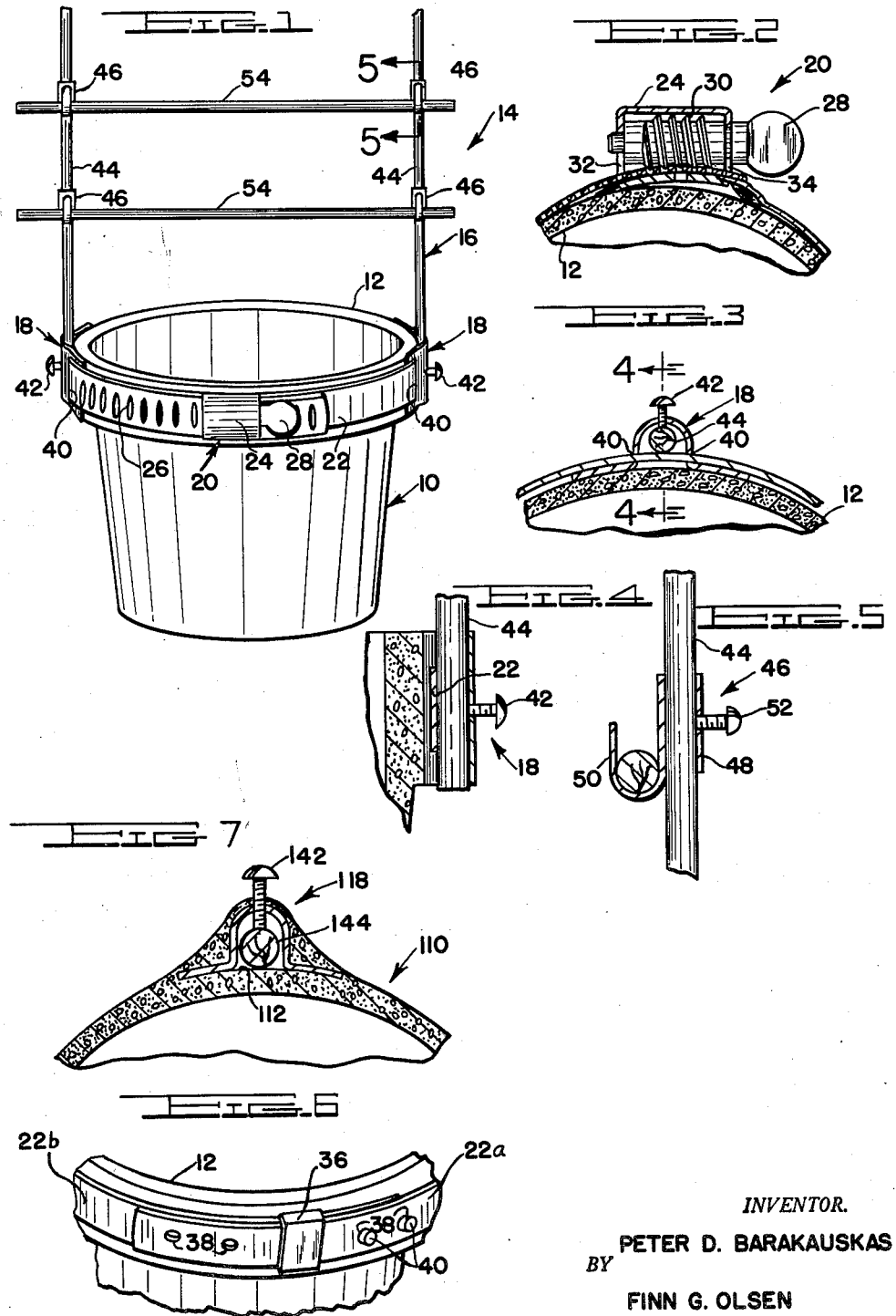
INVENTOR.
PETER D. BARAKAUSKAS
BY
FINN G. OLSEN
ATTORNEY 3,026,649
PLANT SUPPORT
Peter D. Barakauskas, 1605 Westminster Place,
Ann Arbor, Mich.
Filed July 20, 1959, Ser. No. 828,210
3 Claims. (Cl. 47—34)

The present invention relates to plant supports formed either as an attachment for a flower pot or as an integral part thereof.

Plant supports for use with flower pots have been used extensively for a considerable period of time, but none of the prior art devices have been entirely satisfactory in fulfilling their intended purposes. Many of the prior devices are supported in place by inserting the lower ends of a trellis-like structure into the soil within the pot. This is an unsatisfactory supporting arrangement, because the roots of the plants are frequently damaged when inserting the lower ends in place. Similarly, the roots are subsequently damaged when moving or handling the trellis-like structure.

Efforts have been made to mount the trellis-like structures on the flower pot so as to avoid the defects pointed out above, but such structures have been unsatisfactory in that they are rigid, unsightly devices which cannot be selectively adjusted and arranged to provide the desired results.

Accordingly, it is an object of the present invention to provide an improved plant support for a flower pot wherein the trellis can be erected without damage to the plant in the pot.

It is another object of the present invention to provide an improved plant support of the foregoing character wherein the trellis portion of the support is constructed and arranged so that its component parts can be adjusted relative to one another to effect the most desirable appearance and to obtain the most optimum results in supporting the plant.

It is still another object of the present invention to provide an improved plant support of the foregoing character wherein the height of the trellis with respect to the pot can be selectively varied.

It is still another object of the present invention to provide an adjustable band clamp for embracing the external portion of the pot and for holding the trellis by sockets which are circumferentially adjustable in position to permit the trellis to be supported selectively at diametrically opposite positions at the circumference of the pot or at selected positions therebetween on the pot circumference so as to provide greater flexibility in positioning the trellis.

It is still another object of the present invention to provide a plant support which is adjustable in character and wherein the mounting means for the trellis forms an integral part of the pot.

It is still another object of the present invention to provide a plant support which is characterized by the simplicity and adjustability of its components, thereby providing relatively great applicability of the support and providing a low cost unit.

Other objects of this invention will appear in the following description and appended claims, reference being had to the accompanying drawings forming a part of this specification wherein like reference characters designate corresponding parts in the several views.

In the drawings:

FIGURE 1 is a perspective front view of a pot and plant support embodying one form of the present invention;

FIGURE 2 is an enlarged fragmentary section taken on a horizontal plane showing the internal portions of the band clamp embracing the plant pot;

FIGURE 3 is an enlarged fragmentary section taken on a horizontal plane through one of the socket members carried by the band clamp and showing an upright member of the trellis supported therein;

FIGURE 4 is a section taken on the line 4—4 of FIGURE 3;

FIGURE 5 is an enlarged fragmentary vertical section taken on the line 5—5 of FIGURE 1;

FIGURE 6 is a fragmentary perspective rear view of the form of the invention illustrated in FIGURE 1, showing an adjustment feature of the band clamp; and FIGURE 7 is a fragmentary horizontal section of another form of the present invention showing another socket arrangement for supporting the trellis.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring first to FIGURES 1 to 6, inclusive, one form of the present invention will be described in greater detail. The flower pot 10 is a conventional type having a circular top portion 12. A plant support 14 is supported on the exterior of the circular top portion 12 and includes the trellis 16, a pair of socket members 18 and a circular band clamp 20.

The plant support 14 is held in place on the pot 10 by the band clamp 20 which surrounds and embraces the top portion 12. The band clamp has a flat metal band 22 on one end of which is attached the housing 24. The other end of the band has a plurality of transversely extending apertures or slots 26. Rotatably mounted in the housing 24 is a cylindrical tightening turn screw 28 having external threads 30. The housing 24 has slots 32 and 34 through which the end of the band 22 with slots 26 can pass. In this arrangement the threads 30 of the turn screw 28 are fitted into the slots 26 and the latter are shaped so that when the turn screw 28 is turned in one direction, the band 22 will be pulled through housing 24 thereby contracting the circular band, and when the turn screw 28 is turned in the opposite direction the band 22 will be expanded. For a more detailed description of this mechanism attention is directed to the clamp mechanism described in United States Letters Patent 2,395,273.

Thus, it can be seen that when it is desired to secure the plant support 14 to the pot 10 it is only necessary to fit the band clamp 20 around the outer periphery of the top portion 12 and thereafter to contract the diameter of the band clamp 20 by turning turn screw 28 until the band 22 firmly embraces the top portion 12.

Under some circumstances it may be desired to transfer the plant support 14 from pot 10 to another pot (not shown) having a substantially different diameter. Under these circumstances it is desirable to make major changes in diameter of the band clamp 20 without the necessity of doing this entirely by turning of turn screw 28. For this purpose the band 22 has been made in two section 22a and 22b, FIGURE 6, which pass through a sleeve 36 for holding them together. The section 22a has a series of spaced apertures 38 which are of size to accommodate the spaced pins 40 which form an integral part of section 22b. Thus, this joint may be utilized for making large approximate settings of the band clamp 20 to fit over the top portion 12 and then the turn screw 28 can be used for assuring that the band 22 firmly embraces the top portion 12.

The socket members 18 are small sheet metal stampings, each having a screw therein for securing the trellis 16 in a desired vertical position. As can be seen in FIGURES 1, 3 and 4, each socket member 18 is shaped in the form of a channel opening radially inward with respect to pot 10 and being open at upper and lower ends. Vertical slots 40 are cut at opposite sides of the channel through which the band 22 passes. A screw 42 is threadedly connected to the base of the channel for engagement with a portion of the trellis 16 to be described. By virtue of the manner in which the socket members 18 are connected to the band 22 it can be seen that each socket member 18 can be moved to any position around the periphery of the pot 10 merely by loosening the band clamp 20, sliding the socket member 18 along the band 22, and when in a desired location retightening the band clamp 20. Thus, the socket members 18 can be positioned diametrically opposite one another, or at any other relative position around the pot circumference.

The trellis 16 has a pair of stakes or upright members 44 which are inserted into the channel portions of the socket members 18 and are retained in place in any desired vertical position by means of the screws 42. As best seen in FIGURE 4, the upright 44 is held between the inner end of screw 42 and the band 22 and is confined to the upright position by the channel portion of the socket member 18. By virtue of this arrangement the upright members 44 can be easily secured in any desired vertical position in the socket member 18.

Each upright member 44 carries a plurality of axially movable brackets 46, which, as best seen in FIGURES 1 and 5, are sleeves 48 with hook portions 50, and with screws 52 for securing the brackets in a fixed position on upright members 44. The hooks 50 carry therein cross members 54 in the manner illustrated. It can be seen that the cross members can be located in any desired position with respect to the upright members 44 merely by adjustment of the brackets 46. Thus, the cross member 54 can be inclined if desired, with respect to the upright members 44 and also can be set at any desired elevation.

From the foregoing it can be understood that a large variety of arrangements of the plant support 14 can be made with respect to pot 10 and any plant or plants therein. This will permit the most attractive arrangement to be employed and at the same time to protect the plant or plants from being damaged by the plant support 14.

In some instances it may be desired to provide a more simple, but slightly less flexible plant support, and for such a showing attention is directed to the embodiment of the invention shown fragmentarily in FIGURE 7. As here shown the band clamp has been omitted and instead the socket member 118 is permanently secured to the top portion 112 of the pot 110. The screw 142 holds the upright member 144 in a desired vertical position. This embodiment functions the same as the embodiment of FIGURES 1 to 6, inclusive, except that the socket members 118 cannot be moved relative to the pot 110.

Having thus described my invention, I claim:

1. A plant support for a flower pot having a circular upper portion comprising an expansible and contractible circular band clamp adapted to be circumferentially adjusted to fit onto the upper portion of said pot, a pair of socket members slidably mounted on said band by means including horizontally spaced slots on opposite sides of each socket member through which the band of said clamp passes so that each of said socket members may be positioned selectively anywhere around the external periphery of said upper portion, a pair of upright stakes supported respectively in said sockets, at least one bracket adjustably supported on each stake, and at least one cross member supported by a pair of such brackets on said stakes, said cross member being slideable in its associated brackets so that said sockets may be moved to desired positions on said band out of diametrically opposite positions on said pot and the cross member may be supported therebetween.

2. A plant support as defined in claim 1 wherein said upright stakes are vertically adjustable in said socket members.

3. A plant support as defined in claim 1 wherein said brackets are vertically adjustable on said upright stakes.

References Cited in the file of this patent

UNITED STATES PATENTS

| | | |
|---|---|---|
| 510,524 | Smith | Dec. 12, 1893 |
| 597,841 | Dolf | Jan. 25, 1898 |
| 1,271,994 | Barlow | July 9, 1918 |
| 2,083,678 | Wilson | June 15, 1937 |
| 2,395,273 | Hill | Feb. 19, 1946 |

FOREIGN PATENTS

| | | |
|---|---|---|
| 18,647 | Great Britain | Sept. 18, 1901 |
| 664,433 | Great Britain | Jan. 9, 1952 |